United States Patent

[11] 3,596,931

| [72] | Inventor | Charles L. Mishler<br>Odessa, Tex. |
|---|---|---|
| [21] | Appl. No. | 798,012 |
| [22] | Filed | Feb. 10, 1969 |
| [45] | Patented | Aug. 3, 1971 |
| [73] | Assignee | Armor Cote Corporation<br>Odessa, Tex. |

[54] SEAL FOR LINED PIPE
11 Claims, 11 Drawing Figs.

[52] U.S. Cl. .................................................. 285/55,
285/332.2, 285/355, 285/369
[51] Int. Cl. ............................................... F16l 9/14
[50] Field of Search ........................................... 285/55,
369, 332.2, 371, 355, 370, 333, 334; 277/212;
138/109

[56] References Cited
UNITED STATES PATENTS

| 3,516,447 | 6/1970 | Pittman ....................... | 138/109 |
|---|---|---|---|
| 3,199,879 | 8/1965 | Fleming ....................... | 285/55 X |
| 2,805,872 | 9/1957 | Routh ............................ | 285/55 |
| 3,264,013 | 8/1966 | Richardson et al. ........... | 285/369 X |
| 3,298,716 | 1/1967 | Taylor et al. ................... | 285/55 |

FOREIGN PATENTS

| 1,335,488 | 7/1963 | France ......................... | 285/55 |
|---|---|---|---|
| 1,068,068 | 10/1959 | Germany ....................... | 285/55 |

*Primary Examiner*—Dave W. Arola
*Attorney*—Marcus L. Bates

ABSTRACT: A deformable seal for protecting the exposed collar threads of a string of pipe having individual lined joints thereof joined together by a collar, wherein adjacent ends of the pipe joints have the seal interposed therebetween in a manner whereby the compressed seal prevents erosion or deterioration of the collar threads.

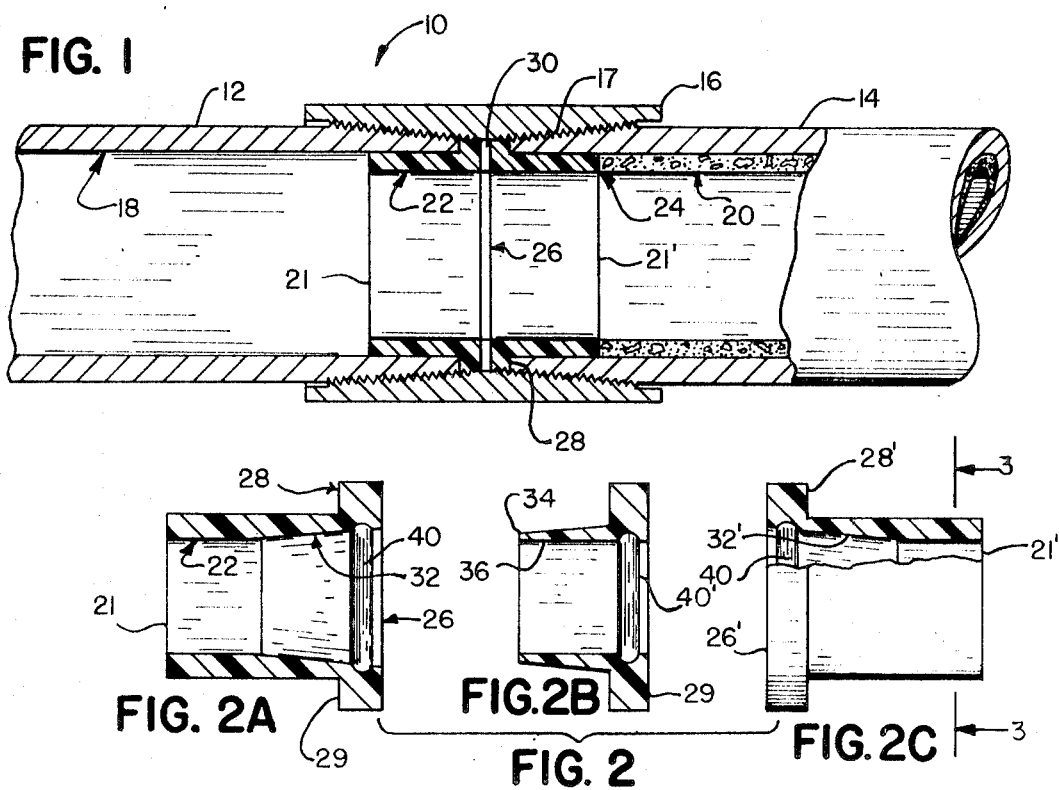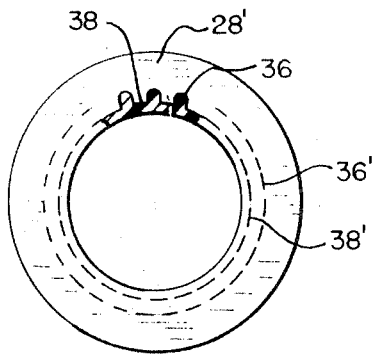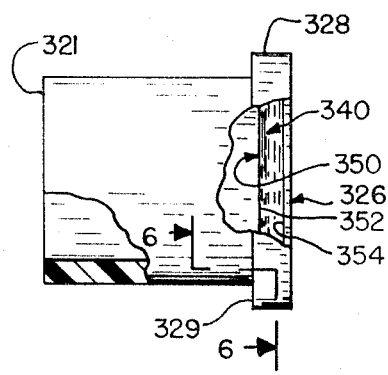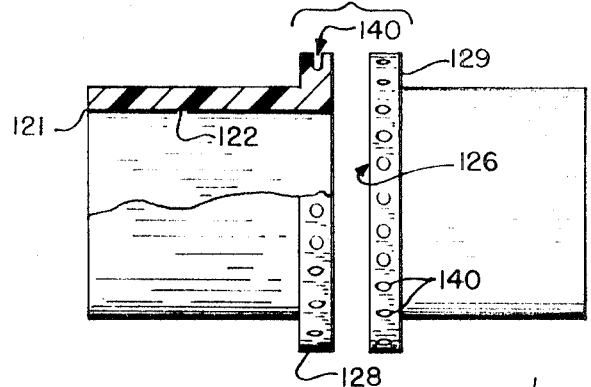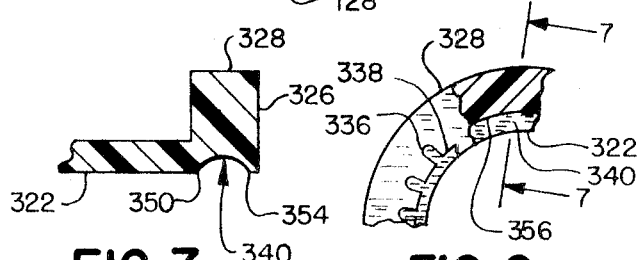
INVENTOR
CHARLES L. MISHLER
BY MARCUS L. BATES Patented Aug. 3, 1971
3,596,931
2 Sheets-Sheet 2
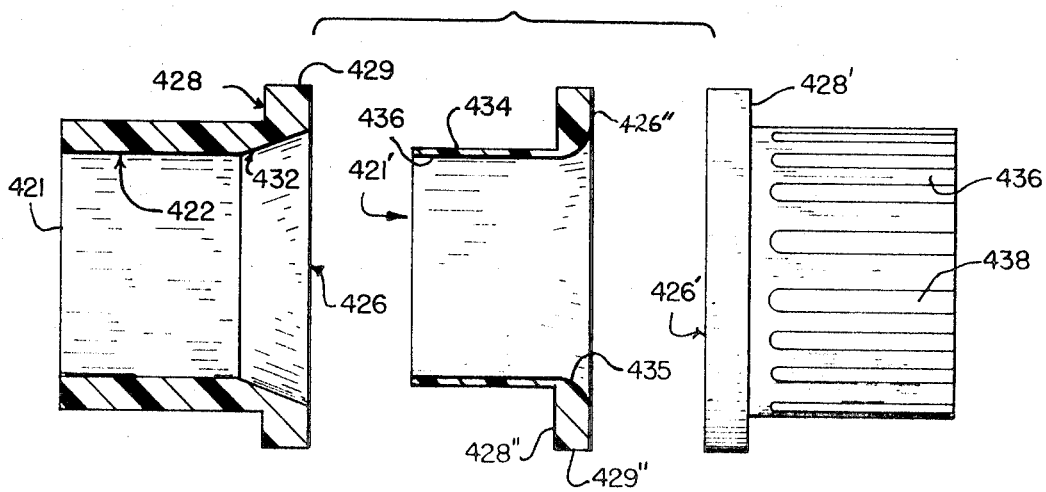
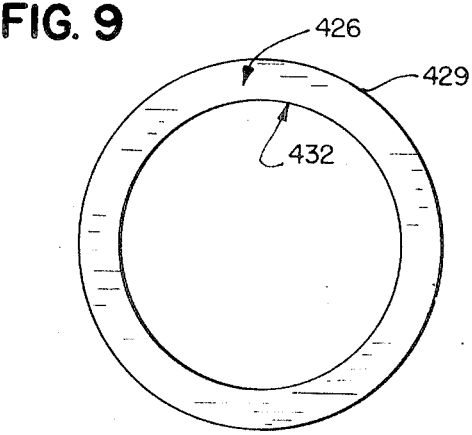
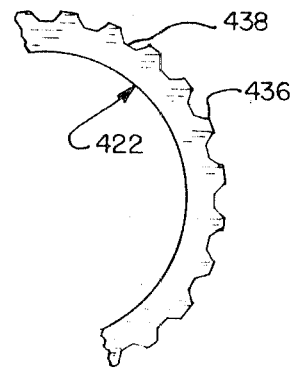
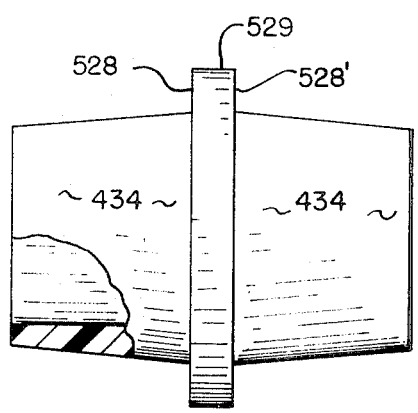
INVENTOR.
CHARLES L. MISHLER
BY MARCUS L. BATES

SEAL FOR LINED PIPE

BACKGROUND OF THE INVENTION

In the production of oil and other petroleum products, the crude or produced oil has a number of naturally occuring undesirable substances such as salt water, corrosive gases, sand, and other corrosive and abrasive material admixed therewith which tend to erode and deteriorate ferrous material. It is common practice, in the production of crude oil, to "line" the inside of pipe, tubing, and other tubular goods with a protective coating in order to isolate the otherwise exposed portions of the metallic tubular goods from the corrosive a action of the crude oil. Where the individual joints of the string of pipe are connected together by a collar, the adjacent ends of the pipe are purposely left spaced apart from one another approximately one-half inch after the threads have been tightly "made up" or mated. The cavity or groove which is jointly formed by the spaced apart adjacent ends of the pipe and the collar threads accordingly leaves an unprotected portion of the collar exposed to the corrosive action of the crude oil. The deterioration of the exposed collar threads by the abrasive and erosive action of material contained in the crude oil is often referred to as collar "washout." The various undesirable chemicals contained within the crude oil enter into chemical reaction with the exposed threads of the collar and brings about rapid deterioration of the exposed metallic portions of the tubing.

In wells having significant amounts of crude oil of this undesirable composition, it has been found advantageous to line the production pipe or tubing with a protective coating or a layer of cement or other coating material in order to minimize the destructive action of the crude oil. From time to time it has been found necessary to remove the tubing from the well in order to carry out various work-over operations peculiar to and common in the field of oil production. Therefore the various joints of pipe which make up the production string must be "broken down" into stands of pipe, and "made-up" into a string of pipe many times during the useful life of the tubing. The collars which join together the various joints of the production tubing are threaded in a manner whereby abutting or adjacent ends of the tubing are always spaced apart from one another approximately one-half inch so that during the life of the collar and tubing the threads may always be tightly made up. It is for this reason that there is always an abundance of threads left within the collar. As the threads become worn from repeated assembly and disassembly, the unused threads permit the tubing to be further tightened. Necessarily, the exposed threaded inside peripheral wall of the collar which is located between the spaced apart adjacent ends of the tubing are left unprotected. This brings about the before mentioned dangerous condition referred to herein as collar "wash out" and if this condition becomes unduly aggravated, penetration through the collar can occur. Sometime the tubing string is thousands of feet in length causing the upper extremity of the string to carry an enormous weight. Collar wash out together with the above described corrosive damage can result in parting of the tubing string due to reduction in structural integrity of the collar, and should the tubing string part, the entire string collapses within the well, destroying the lined pipe, and presenting a costly finishing job of removing the bent pipe, which, of course, must all be replaced.

It is desirable to eliminate collar washout. It is desirable to eliminate the corrosive deterioration which occurs to the exposed collar threads. It is especially desirable to be able to obviate the foregoing undesirable conditions by the provision of a protective seal which isolate the collar from the destructive action of the crude in an economical and reliable manner.

SUMMARY OF THE INVENTION

This invention relates to a seal for protecting the exposed collar threads and exposed adjacent terminal ends of a string of pipe having the individual lined joints thereof joined together by a collar. The seal is comprised of two individual members, each identical in construction with each member having a circumferentially disposed flange from which there depends a tubular insert. Each insert is slidably received within the marginal end portion of a pipe joint with the flange being disposed in abutting relationship with the face of the pipe end, thus enabling the flanges to abut each other and to fill the cavity formed between the spaced apart ends of the pipe as well as the exposed inside peripheral wall surface of the collar. When the pipe joints are mated, the flanges of the seal are compressed together and forced into sealing engagement with respect to the pipe ends and the inside exposed threads of the collar. Means are provided for controlling the deformation of the seal in an outward direction to thereby prevent the seal from improperly deforming inwardly in a manner which may restrict flow of fluid through the pipe.

One important feature of the present invention includes a removable expander having a flange and tubular insert, with the insert being received within either of the main body members in a manner which enhances the sealing action of the assembled seal.

It is therefore an important object of the present invention to provide a deformable seal for preventing collar wash out between lined joints of a pipe.

Another object of the present invention is the provision of a seal means made up of a multiplicity of parts which can be inserted into the end of adjacent joints of pipe so that when the pipe is mated to a collar, the exposed threads thereof are isolated from any fluid which may flow therethrough.

Still another object of the present invention is the provision of a seal means having incorporated therein an improved design which effectively causes portions of the seal to deform in a predetermined direction to thereby effectively seal the cavity formed between exposed collar threads and adjacent depending ends of pipe.

A still further object of the present invention is the provision of a seal for use in pipe joints which are joined together by a collar wherein the seal means includes first and second identical members together with a removable expanded which enhances the operation of the seal.

Another object of the present invention is the provision of a seal for use in conjunction with individual lined joints of pipe which are joined together by a collar, wherein the seal eliminates the problem of or possibility of improperly mating the ends of the pipe.

Still another object of the present invention is the provision of a seal means for use in pipe joints which are joined together by a collar, wherein the seal means obviates the heretofore problem of a seal breakage during handling and storing of the pipe.

Other objects and advantages which are inherent in the construction of a seal made in accordance with the present invention will become apparent to those skilled in the art from a consideration of the various embodiments illustrated in the drawings and described in detail in the following specification.

BRIEF DESCRIPTION OF THE DRAWINGS

FIG. 1 is a fragmentary partly cross-sectional view taken longitudinally along a string of pipe and showing a pipe joint having adjacent pipe end thereof joined together by a collar;

FIG. 2 is a partly cross-sectional view of a seal which can be used in conjunction with the foregoing pipe joint;

FIG. 3 is a more or less cross-sectional view taken approximately along line 3–3 of FIG. 2;

FIG. 4 is a partly cross-sectional view of a modification of FIG. 2;

FIG. 5 is a partly cross-sectional view of a modification of FIG. 4;

FIG. 6 is a fragmentary partly cross-sectional view taken along line 6–6 of FIG. 5;

FIG. 7 is an enlarged partly cross-sectional view of a fragment of FIG. 5;

FIG. 8 is a partly cross-sectional view of still another modification of the present invention;

FIG. 9 is an end view showing part of the device seen in FIG. 8;

FIG. 10 is a fragmentary representation of an end view of part of the seal means seen in FIG. 8; and FIG. 11 is a modification of the removable expander of FIG. 2.

DETAILED DESCRIPTION OF THE VARIOUS EMBODIMENTS

Wherever possible, like characters of reference denote like parts throughout the several figures of the drawings.

Numeral 10 of FIG. 1 generally indicates one of the uses of one of the various embodiments of the invention, and illustrates pipe joint 12 threadedly connected to a cement lined pipe joint 14 by a collar 16, all of which have mated threads 17 made thereon in the usual manner. The inside peripheral wall surface 18 has a thin protective plastic coating thereon while the inside surface wall of pipe 14 is provided with a substantial thickness of cement 20. In actual practice it would be expected that the entire string of pipe would be provided with the same coating.

The trailing edge 21 of a plastic seal has been inserted into the end of the pipe 12 while the trailing edge 21' of a similar seal is seen to be of approximately the same wall thickness as the cement lining of the pipe. The interface 26 formed by the abutting flange faces terminates at its outer extremity within a cavity 30 which is formed by the adjacent terminal ends of the pipe joints and the inside peripheral threaded wall surface of the collar.

FIG. 2, comprised of FIGS. 2A, 2B, and 2C, illustrates two identical seal members, each being represented in FIGS. 2A and 2C. Each seal member cooperates with a removable expanded such as seen in FIG. 2B, all of which cooperates together to form a seal in accordance with the present invention. The seal of FIGS. 2A and 2C each have a trailing edge portion 21, an inside peripheral wall surface 22 of constant diameter, and a circumferentially extending flange 28 having a flange face 26 at one terminal end thereof and a shoulder 29. The inside peripheral wall surface located between the constant diameter portion 22 and face 26 is tapered inwardly in a direction toward the trailing edge and is provided with a circumferentially extending groove 40 approximately 0.005 inches in depth and is coextensive with the flange. The groove is centrally disposed with respect to the face and shoulder of the flange in a manner as best seen in FIG. 7.

The removable expander of FIG. 2B is provided with outer wall portion 34 which is tapered in a manner complementary to that of taper 32 with the depending tapered free end thereof being received along the midportion of the complementary taper 32 at approximately the location indicated by the arrow at numeral 32. Flange face 29 of the expander mates against flange face 26 or 26' as will be more fully discussed later on. A circumferentially extending groove 40', similar to the before mentioned groove 40, is centrally located with respect to the flange of the removable expander.

The insert portion of the seal members can be provided with ribs 36 as seen in FIG. 3. The spaced apart longitudinally extending ribs leave voids 38 therebetween for a purpose which will be pointed out in more detail later on. The ribs preferably extend from within close proximity of the shoulder of the flange to the trailing edge of the insert.

FIG. 4 sets forth another embodiment of the present invention wherein a circumferentially extending flange 128 is integrally attached to an insert portion having a trailing edge 121. The outside marginal edge portion of the flange is provided with outwardly opening radially spaced apart apertures 140 with the apertures being approximately three thirty-second inches in diameter and 0.050 inches in depth, for a flange width of one-fourth inch, for example.

FIG. 5 through 7 illustrates a seal member which includes a circumferentially extending flange 328 from which there depends an insert portion having a trailing edge portion 321. A groove 340, similar to the before mentioned groove of FIG. 2, has an innermost edge portion 350 and an outermost edge portion 354. The outer peripheral wall surface of the insert portion is provided with spaced apart longitudinally extending ribs 336 which radiate from the insert to provide a scalloped like pattern when viewed in cross section in end view as illustrated in FIG. 6.

FIGS. 8 through 10 illustrate a seal means comprised of a removable expander which cooperates with two seal members. Each seal member includes an insert portion in the form of a cylindrical body having an inside peripheral wall surface 422 for a limited distance along its longitudinal axis. The inside wall at 432 tapers in an outward direction towards the flange face 426. The flange 428 has a major diameter 429 which enables the flange to be received within the before mentioned cavity of a pipe collar. The removable expander includes a flange face 426' and a shoulder 428'. The expander is provided with a constant inside diameter 436 which outwardly diverges in a curve at 435 towards the flange face for a distance which is preferably less than the thickness of the flange. Outside flange diameter 429' is substantially equal to the outside diameter 429 of the seal member flange. A series of longitudinally disposed spaced apart ribs 436 provide a multiplicity of grooves 438 which are circumferentially disposed about the outer peripheral surface of the insert portion of the seal member. The ribs may be in the form of a sawtoothed pattern, as seen in FIG. 10, if desired. Alternatively, the ribs may be in the illustrated form of FIG. 3.

FIG. 11 illustrates the details of a removable expander which is similar to the expander of FIG. 2, with the exception that the expander is symmetrical along a plane taken through the flanges thereof, that is, normal to the longitudinal axis of the expander. The removable expander includes spaced apart trailing edge portions that are adapted to be received within both of the adjacent spaced apart seal members of FIG. 2A and 2C.

OPERATION

In operation, a multiplicity of lined joints of pipe, such as seen at 14, are connected together by a collar, leaving the adjacent ends of the pipe in spaced apart relationship, with respect to each other, thereby forming an inwardly opening cavity 30. In order to prevent washout of deterioration of the exposed portion of the collar as well as the terminal ends of the pipe, a seal means made in accordance with one of the embodiments of the present invention is placed within the pipe in the illustrated manner of FIG. 1, to thereby effectively seal the collar and pipe ends from the deleterious effects which the crude oil passing therethrough would otherwise have on the exposed metal surface which forms the cavity.

The seal member is best placed within the pipe ends during the application of the liner. Where an epoxy or plastic like liner is applied to the inside peripheral wall surface of the pipe, the seal member is placed within the pipe before the lining compound sets up. This expedient permits the liner and the seal to be firmly bonded together.

Where the pipe is lined with cement, the seal is best placed into the pipe ends prior to spinning the pipe. This is accomplished by forcing the seal into the pipe end while the cement is wet, whereupon the cement displaced by the seal can be smoothed by troweling with one's finger, after which the pipe is spun or subjected to a centrifugal action in order to remove excess moisture from the cement liner or coating. As will be realized by those skilled in the art, each member of the seal becomes bonded to the cement due to entrapment of cement within the space located between the ribs of the insert portion of the seal member.

In making up a string of pipe wherein the seal member of FIG. 2A or 2B has been affixed to each terminal end of the individual joints of the pipe by a previous operation, the removable expander of FIG. 2B, can be placed into either seal member and the pipe joints threadedly connected together by the collar in the usual manner. As the pipes are mated by the collar, the terminal ends of the pipe are compressed against each of the corresponding flange shoulders thereby exerting a force toward the interface presented by the abutting flange faces. This action forces the plastic seal to deform and fill the entire cavity 30 to thereby effectively seal the metallic portion of the cavity against fluid flow. The groove located about the inside peripheral wall surface of the flange enables an outward expansion of the seal to occur an amount sufficient to avoid projection or deformation of portions of the seal into the flow path of fluid. Hence, the groove prevents the inside portion of the seal member from distorting or buckling in the groove vicinity.

In the embodiment of FIG. 2, the tapered male portion 34 is received within and expands against the tapered female portion 32 to thereby force the tapered area 32 in an outward direction. This action together with the force exerted against the flange shoulders by the pipe joint ends provides a powerful force wherein the plastic flange is sealingly deformed into the cavity.

In making up a string or 2 inch inside diameter cement lines pipe, the "make up" or distance between the terminal ends of the pipe generally varies between 1 3/16 inch to three-fourths inch. Stated differently, the cavity 30 which is to be filled with the flanges of the seal means, varies between 1 and 3/16 inch and three-fourths inch. This range of cavity width is referred to as "minimum" and "maximum make up." A new string of pipe will exhibit a makeup of 1 3/16 inch while an old string pipe will exhibit a makeup of three-fourths inch, with the difference in make up being attributed to the accumulated wear of the pipe threads.

In string of cement lined downhole production tubing, the joints of pipe are made up by employing power tongs to both expedite the assembly of the string as well as to assure a tight makeup of the threads. The removable expander of FIG. 2B is interposed between the seal members of FIGS. 2A and 2C with flow preferably occuring in a direction from FIG. 2C towards FIG. 2A, that is, from right to left. Since the removable expander is placed within the collar with the outer wall or tubular portion "looking downhole," the removable expander will remain within the collar when the string is subsequently broken down into strands of pipe.

The primary purpose of the removable expander of FIG. 2 is to offer a movable pair of interfaces against which the flange faces of the seal members may work during makeup. Without the slippage provided by the removable expander, the seal members are often damaged, enabling wash out of the cavity 30 to occur as well as bringing about increased resistance to flow.

When the cement lined pipe is used above ground, including buried pipe, the makeup of the threads is not critical, and therefore considerably less force is imparted into the seal means. The probability of damaging the seal means is less likely in this type installation and accordingly, the seal means of FIGS. 4 and 5 can be used to advantage. In using the seal means of FIGS. 4 and 5 care must be taken to assure that the thickness of the flanges are sufficient to fill the cavity 30.

Still looking at FIG. 4, it will be noted that the outer peripheral surface of the flange is provided with the before mentioned inwardly directed apertures. With the seal member properly placed within the pipe joint ends, and upon the pipe joints being made up with the collar, the adjacent pipe ends exert a force against the shoulder of the flanges thereby forcing the flange faces into compressed relationship. The apertures within the flange permit the plastic flange to be deformed in a direction towards the collar cavity that is, the flow as the plastic deforms, follows the path of least resistance.

The accumulated thickness of the flanges of the seal means of FIGS. 4 and 5 should be about 20 percent greater, or wider than the width of the cavity so as to enable the plastic material to completely fill the cavity and to exert a positive seal between the flange faces.

In the embodiment of FIG. 8 it will be noted that the inside peripheral surface of the seal member is constant in diameter at 422 for a major portion of its length in a longitudinal direction, after which it diverges or tapers in an outward direction, as seen at 432, so as to anable the tubular portion 434 of the removable expander to be forced into the interior of the seal member, with the flange face of the seal member being force towards the flange shoulder of the expander and the flange face of the expander being pressed against the face of the remaining sealmember. The expanded is constant in both inside and outside diameter along the tubular portion thereof, except for the previously noted outwardly curved portion 435 near the face 426" which permits a more streamlined flow to occur. The outer wall surface of the cylindrical body of the seal member is provided with spaced apart ribs 436 as seen in FIG. 10. The rubs are preferably square in configuration when viewed in cross section, although the ribs could alternatively be fabricated with curved edges portions, if desired.

In making up joints of pipe into a string, the expander of FIG. 8 is preferably positioned with respect to the seal members in a manner as illustrated in FIGS. 2 or 8, with downhole being in a direction to the left. When the pipe is later broken into stands of pipe, this expedient enables the expander to remain adjacent the seal member which is located within the pipe joint to which the collar is attached. The collar is therefore always left attached to the upper extremity of each stand, forming the "box," because the elevator (or the slips associated with the elevator) must engage the collar each trip of the traveling block as an additional stand is brought out of the hole while breaking up the pipe string. Accordingly, this position of the expander prevents damage occuring to the insert since the expander remains in the "box" with the "pin" supporting each stand of the pipe.

The seal means illustrated in FIGS. 8—10 is preferably used in conjunction with downhole cement lined pipe where a water-flooding project is being carried out. The curved or streamlined portion 435 of the removable expander reduces turbulance, or resistance to flow in the critical region of the seal means. Because of extremely high pressure or high rates of flow employed in water flooding, it has been found that without the removable expander, the washout eventually occurs due to cavitation at the interface of the seal members. Hence, the streamlined portion of the removable expander greatly extends the life of the seal means.

Another important feature of the seal means of FIG. 8 lies in the cooperative action between the tubular or male portion 434 which is forcibly received within the insert or female portion 422 of the seal member. Since the outside diameter of the tubular portion is equal to the inside diameter of the insert portion, the former must be slightly inwardly deformed while the latter is slightly outwardly deformed as they are slidably mated together in telescoping fashion. This force fit effectively seals the peripheral interface which is formed between the male/female portions of the expander and insert portion of the seal means. Accordingly, while flange face 426' must abut flange face 426" in order to effect a sealed relationship therebetween, it is not necessary for flange face 426 to forcibly abut the shoulder 428" to effect a proper seal because of the before mentioned cooperative action of the male/female portions of the one seal member and the removable insert. Accordingly, for a 2 inch inside diameter pipe, the flanges may each be fabricated only one-fourth inch in thickness. At a minimum make up of 3/16 inch the flange faces 426',426" will forcibly abut one another while the flange face 426 and shoulder 428' will be spaced apart from one another seven-sixteenths inch. At maximum make up the flange faces will all abut one another (in the manner similar to that of FIG. 2) since the male/female portions of the seal members will have fully telescoped together. This expedient provides a positive seal for downhole tubing collars, in addition to avoiding injury to the various members of the joints are made up.

The removable expander of FIG. 11 is provided with two tubular body portions, each of which is received within the seal of a pipe. Except for the symmetry obtained along a plane passing parallel to and through the flange, the removable expander of FIG. 11 is identical to that illustrated in FIG. 2B.

The removable expander of FIG. 11 is considered less desirable than the embodiment illustrated in FIGS. 2 and 8 for use in downhole tubing because the expander will occasionally remain in the pin end of a stand of pipe, and when the stand is set down on the floor of the work-over rig, one of the tubular portions 434 will be forced to support the stand and accordingly become damaged. Furthermore, should the expander inadvertently remain in the pin end of the stand, it is possible to mate this pin with a box which also has an expander therein. This action not only results in damage to the improperly assembled seal means but also results in another seal means being assembled wherein the removable expander is left out of the assembly. Such a malfunction of assembly is impossible with the embodiment of either FIGS. 2 or 8.

The seal of the present invention may be made of plastic, rubber, or plastic or rubberlike material, so long as the material is deformable. It is pointed out that as a pipe collar is used, the free ends of the pipe which form the cavity 30 will tend to be fitted closer together due to the accumulated wear of the threads and accordingly after excessive wear has caused the adjacent pipes to be closely spaced from one another, it is advantageous to replace the removable expander when the flanges of the seal become compressed insufficiently to provide an adequate seal.

As a specific example of the physical dimensions of a seal means made in accordance with the teachings of FIGS. 8 through 10, wherein the seal means is to be used in a 2-inch inside diameter pipe, the flange are each one-fourth inch in thickness, that is, from flange face to flange shoulder, with the cylindrical body or insert portion being 1 inch in length. The inside diameter of the seal member is 1 ¾ inch, with the flange having an outside diameter of two 2 5/16 inch, while the cylindrical body has an outside diameter of 2 inches. Twelve ribs are spaced apart from each other five-sixteenths inch, leaving a slot one-sixteenth inch in depth. The bevel at 432 forms a 30° angle with respect to the longitudinal axis. The outside diameter of the removable expander is identical to the inside diameter of the cylindrical body, with the inside diameter of the tubular body of the expander being 1⅝ inches.

I claim:

1. In a string of pipe having individual lined joints thereof joined together by a collar, with adjacent ends of adjacent pipe joints being spaced apart to expose a portion of the inside peripheral surface of the collar, the improvement comprising:
a seal for protecting the exposed collar threads, said seal including a first and second seal member with each member of the seal having a flange portion and an insert portion, said flange having a face and a shoulder, said insert portion being in the form of a cylindrical body having one end attached to said flange and a trailing end portion; the outer major diameter of said insert portion adapted to be received within the marginal end of the pipe, the inside wall surface of said insert portion being a continuation of the inside wall surface of said flange portion; the outside diameter of said flange portion being smaller than the minimum inside diameter of the collar and larger than the outside diameter of said insert portion to thereby enable the insert portion to be received within the pipe with said shoulder of said flange being received in abutting relationship against the terminal end of the pipe;
means associated with the seal for forcing the flange of each member into sealing engagement with the exposed portion of the inside peripheral surface of the collar, the last said means including a groove circumferentially disposed about the inside peripheral wall surface of said flange, whereby;
the face of each seal member, when subjected to an axial force by the action of the collar being made up with adjacent pipe joints causes the flanges of the seal members to expand radially outward into sealing engagement with the exposed portion of the inside peripheral surface of the collar.

2. The improvement of claim 1 wherein said groove has a width of less than the distance between said flange face and shoulder, said groove having a depth less than the wall thickness of said insert portion;
and said insert portion is provided with a series of spaced apart longitudinally extending ribs.

3. In a string pipe having individual lined joints thereof joined together by a collar, with adjacent ends of adjacent pipe joints being spaced apart to expose a portion of the inside peripheral surface of the collar, the improvement comprising:
a seal for protecting the exposed collar threads, said seal being comprised of a first and second seal member with each member of the seal having a flange portion and an insert portion, said flange having a face and a shoulder, said insert portion being in the form of a cylindrical body having one end attached to said flange and a trailing end portion; the outer major diameter of said insert portion adapted to be received within the marginal end of the pipe, the inside wall surface of said insert portion being a continuation of the inside wall surface of said flange portion; the outside diameter of said flange portion being smaller than the minimum inside diameter of the collar and larger than the outside diameter of said insert portion to thereby enable the insert portion to be received within the pipe with said shoulder of said flange being received in abutting relationship against terminal end of the pipe;
means associated with the seal for forcing the flange of each member into sealing engagement with the exposed portion of the inside peripheral surface of the collar, the last said means including a series of spaced apart apertures radially disposed about the marginal outer edge portion of said flange; whereby:
the face of each seal member, when subjected to an axial force by the action of the collar being made-up with adjacent pipe joints, causing the flanges of the seal members to expand radially outward into sealing engagement with the exposed portion of the inside peripheral surface of the collar.

4. In a string of pipe having individual lined joints thereof joined together by a collar, with adjacent ends of adjacent pipe joints being spaced apart, the improvement comprising:
a seal for protecting the exposed collar threads, said seal including a first and second seal member with each member of the seal having a flange portion and an insert portion, said flange having a face and a shoulder, said insert portion being in the form of a cylindrical body having one end attached to said flange and a trailing end portion; the outer major diameter of said insert portion adapted to be received within the marginal end of the pipe, the inside wall surface of said insert portion being a continuation of the inside wall surface of said flange portion the outside diameter of said flange portion being smaller than the minimum inside diameter of the collar and larger than the outside diameter of said insert portion to thereby enable the insert portion to be received within the pipe with said shoulder of said flange being received in abutting relationship against the terminal end of the pipe;
means forming a converging taper on the inside peripheral wall of a said seal member with the major diameter of the taper being located near the face of said flange;
a removable means for forcing the flange of each member into sealing engagement with the exposed portion of the collar; said expander having a flange from which there depends a tubular body portion said tubular body portion having an outer peripheral wall surface which reduces in diameter in a direction away from the last said flange, the last stated taper being complementary with respect to the recited taper of said seal member, the last said flange having a major diameter equal to that of the first recited flange, whereby:

said seal, when subjected to an axial force brought about by the action of the collar being made-up with adjacent pipe joints, causes the flanges of the seal to sealingly isolate the exposed portion of the inside peripheral surface of the collar.

5. The improvement of claim 4 wherein said removable expander means includes a groove circumferentially disposed about the inside wall surface of the flange thereof.

6. The improvement of claim 4 wherein said insert portion of said first and second seal member includes a series of a series of longitudinally disposed radially spaced apart ribs circumferentially disposed about the outer surface thereof to thereby present a scalloped cross-sectional area.

7. In a string of pipe having individual lined joints thereof joined together by a threaded connector means, with adjacent pipe joints being made up in a manner to expose a portion of the inside peripheral surface of the connector means, the improvements comprising:

a seal for protecting the exposed threads of the connector means, said seal includes means forming a first and second seal member with each member of the seal having a flange portion and an insert portion said flange having a face and a shoulder, said insert portion being in the form of a cylindrical body having one end attached to said flange and a trailing end portion; the outer major diameter of said insert portion to be received within the marginal end of the pipe, the inside wall surface of said insert portion being a continuation of the inside wall surface of said flange portion; the outside diameter of said flange portion being smaller than the minimum inside portion of the threaded connector means and larger than the outside diameter of said insert portion to thereby enable the insert portion to be received within the pipe with said shoulder of said flange being received in abutting relationship against the terminal end of the pipe;

means forming a taper on the inside peripheral wall surface of one said seal member, said taper converging in a direction away from said flange;

a removable expander for forcing the flange of each said seal member into sealing engagement with at least part of the exposed portion of the inside peripheral surface of the connector means, said removable expander having a tubular body and a flange circumferentially disposed thereabout, at least part of said tubular body of said expander adapted to be received within one seal member, whereby:

the seal, when subjected to an axial force by the action of the threaded connector means being made-up with adjacent pipe joints, causes the removable expander to move into sealing engagement with the first and second seal members and the flanges of each said seal member into sealing engagement with said exposed portion of the connector means.

8. In a string of pipe having individual lined joints thereof joined together by a means forming a fastener such as a threaded collar, with adjacent ends of adjacent pipe joints being arranged to expose a portion of the inside peripheral threaded surface of the fastener, the improvement comprising:

a seal for protecting the exposed threads, said seal being comprised of a first and second seal member and a removable expander;

said first and second seal member each having a flange portion and an insert portion, each said flange having a face and a shoulder, said insert portion being in the form of a cylindrical body having one end attached to said flange and a trailing end portion; the outer major diameter of said insert portion adapted to be received within a marginal end portion of the pipe, said insert portion having an inside wall surface which is a continuation of the inside wall surface of the said flange portion; the outside diameter of said flange portion being smaller than the minimum diameter of the collar and larger than the outside diameter of said insert portion to thereby enable the insert portion to be received within the pipe with said shoulder of said flange being received in abutting relationship against a portion of the pipe;

said cylindrical body includes an inside diameter of constant dimensions for a major portion of its longitudinal length, with the diameter being increased adjacent the flange thereof;

said removable expander having a tubular body and a flange, said tubular body depending from said flange; the outermost portion of said tubular body being of a diameter to enable it to be forced into said cylindrical body in close fitting tolerance; whereby:

each seal member, when subjected to an axial force by the action of the fastener being made-up, causes the flanges of the seal members to sealingly engage the exposed portion of the inside peripheral surface of the fastener, while the tubular body of the removable insert is forced into one of the seal members.

9. In a string of pipe having individual lined joints thereof joined together by a threaded collar, with adjacent ends of the pipe joints being spaced apart to expose a portion of the inside peripheral surface of the collar, the improvement comprising:

a seal for protecting the exposed collar threads, said seal including a first member and a second member with each said member having a flange portion and an insert portion, said flange having a face and a shoulder, said insert portion being in the form of a cylindrical body having one end attached to said flange and a trailing end portion; the outer major diameter of said insert portion adapted to be received within the marginal portion of the pipe, the inside wall surface of said insert portion being a continuation of the inside wall surface of said flange portion; the maximum outside diameter of said flange portion being smaller than the minimum inside diameter of of the collar and larger than the outside diameter of said insert portion to thereby enable the insert to be received within the pipe with the shoulder of said flange being received in abutting relationship against the terminal end of the pipe;

a removable expander having a flange from which there depends a tubular body; the tubular body being of an outside diameter at least equal to the smallest outside diameter of said insert to enable said tubular body to be forcibly and telescopingly received within said insert, whereupon tightening the collar axially compresses the flange faces of said first and second members, towards one another and against the flange of the expander to thereby radially expand the flanges of said seals in an outward direction into sealing engagement with at least a portion of said inside peripheral surface of said collar.

10. The improvement of claim 9 wherein the inside diameter of said removable expander has a marginal end portion which diverges in a direction towards the flange thereof, to thereby present a streamlined end portion to the flow of fluid.

11. The improvement of claim 9 wherein the inside diameter of said seal member has a diverging marginal edge portion adjacent the flange thereof, and the inside diameter of said removable expander has a marginal end portion which diverges in a direction towards the flange thereof, to thereby present a streamlined end portion to the flow of fluid.

UNITED STATES PATENT OFFICE
CERTIFICATE OF CORRECTION

Patent No. 3,596,931                              Dated August 3, 1971

Inventor(s) Charles L. Mishler

It is certified that error appears in the above-identified patent and that said Letters Patent are hereby corrected as shown below:

Column 1, line 13, cancel "a"; line 63, "finishing" should read -- fishing --; column 2, line 25, cancel "a"; line 51, cancel "a"; line 63, "end" should read -- ends --; column 3, line 39, "edge" should read -- end --; line 47, "0.005" should read -- 0.050 --; column 4, line 37, "flanges" should read -- flange --; line 53, cancel the comma (,), after "Figure 1"; line 54, "effects" should read -- effect --; column 5, line 36, after "In" insert -- a --; line 71, after "cavity" insert a comma -- , --; column 7, line 13, "the", second occurrence, should read -- a --; column 8, line 5, cancel "of"; line 10, after "string" insert -- of --; line 30, after "against" insert -- the --; line 39, "causing" should read -- causes --; line 45, after "apart" insert -- to expose a portion of the inside peripheral surface of the collar, --; line 56, after "portion" insert -- ; --; line 66, after "removable" insert -- expander --; line 69, before "said" insert a comma -- , --; column 9, line 10, cancel "a series of"; line 22, insert a comma -- , -- before "said"; line 31, "portion", second occurrence, should read -- diameter --; line 46, before "seal", insert -- said --; column 10, line 4, cancel "the", first occurrence; line 5, after "minimum" insert -- inside --; line 37, "portion" should read -- end --; line 48, "outside" should read -- inside --; line 52, cancel the comma ",".

Signed and sealed this 19th day of December 1972.

(SEAL)
Attest:

EDWARD M. FLETCHER, JR.                    ROBERT GOTTSCHALK
Attesting Officer                          Commissioner of Patents